United States Patent
Hong et al.

(10) Patent No.: US 11,843,108 B2
(45) Date of Patent: Dec. 12, 2023

(54) ELECTRODE STRUCTURE, MANUFACTURING METHOD THEREFOR, AND ELECTROCHEMICAL ELEMENT COMPRISING SAME

(71) Applicants: SEOUL NATIONAL UNIVERSITY R&DB FOUNDATION, Seoul (KR); GRAPHENE SQUARE INC., Seoul (KR)

(72) Inventors: Byung Hee Hong, Gyeonggi-do (KR); Sang Min Kang, Seoul (KR); Quang Trung Truong, Gyeonggi-do (KR)

(73) Assignees: SEOUL NATIONAL UNIVERSITY R&DB FOUNDATION, Seoul (KR); GRAPHENE SQUARE, INC., Seoul (KR)

( * ) Notice: Subject to any disclaimer, the term of this patent is extended or adjusted under 35 U.S.C. 154(b) by 776 days.

(21) Appl. No.: 16/971,742

(22) PCT Filed: Jun. 1, 2018

(86) PCT No.: PCT/KR2018/006283
§ 371 (c)(1),
(2) Date: Nov. 5, 2020

(87) PCT Pub. No.: WO2019/164066
PCT Pub. Date: Aug. 29, 2019

(65) Prior Publication Data
US 2021/0057718 A1 Feb. 25, 2021

(30) Foreign Application Priority Data
Feb. 23, 2018 (KR) .................. 10-2018-0021790

(51) Int. Cl.
*H01M 4/133* (2010.01)
*H01G 11/36* (2013.01)
(Continued)

(52) U.S. Cl.
CPC ............ *H01M 4/133* (2013.01); *H01G 11/36* (2013.01); *H01G 11/86* (2013.01);
(Continued)

(58) Field of Classification Search
CPC .. H01M 4/0404; H01M 4/0471; H01M 4/133; H01M 4/1393; H01M 4/362; H01M 4/587; H01M 4/661; C01P 2004/64
See application file for complete search history.

(56) References Cited

U.S. PATENT DOCUMENTS

| 2015/0085427 A1* | 3/2015 | Xie | ................. B01D 53/02 156/80 |
| 2016/0043384 A1* | 2/2016 | Zhamu | ................. H01M 4/386 427/122 |

FOREIGN PATENT DOCUMENTS

| KR | 1020110136340 A | 1/2013 |
| KR | 1020120121265 A | 2/2013 |

OTHER PUBLICATIONS

Kang, S et al., Roll-to-Roll Laser-Printed Graphene-Graphitic Carbon Electrodes for High-Performance Supercapacitors, ACS, 2017, pp. 1-18.*
(Continued)

*Primary Examiner* — Brittany L Raymond
(74) *Attorney, Agent, or Firm* — DILWORTH IP, LLC

(57) ABSTRACT

The present disclosure provides an electrode structure including a metal thin film and a patterned graphene-graphitic carbon composite layer disposed on the metal thin film, a method for fabricating the electrode structure using laser printing, and an electrochemical device including the same.

16 Claims, 13 Drawing Sheets

(51) Int. Cl.
  *H01G 11/86* (2013.01)
  *H01M 4/04* (2006.01)
  *H01M 4/1393* (2010.01)
  *H01M 4/587* (2010.01)
  *H01M 4/66* (2006.01)
  *H01M 10/0525* (2010.01)
  *H01M 4/02* (2006.01)

(52) U.S. Cl.
  CPC ....... *H01M 4/0404* (2013.01); *H01M 4/0471* (2013.01); *H01M 4/1393* (2013.01); *H01M 4/587* (2013.01); *H01M 4/661* (2013.01); *H01M 10/0525* (2013.01); *H01M 2004/021* (2013.01)

(56) References Cited

OTHER PUBLICATIONS

Pang, S et al., Patterned Graphene Electrodes from Solution-Processed Graphite Oxide Films for Organic Field-Effect Transistors, Advanced Materials, 2009, pp. 3488-3491.
Kang, S et al., roll-to-roll laser-printed graphene-graphitic carbon electrodes for high-performance supercapacitors, ACS Applied Materials & Interfaces, pp. A-F.

* cited by examiner

ELECTRODE STRUCTURE, MANUFACTURING METHOD THEREFOR, AND ELECTROCHEMICAL ELEMENT COMPRISING SAME

TECHNICAL FIELD

This application claims the benefit of the filing date of Koran Patent Application No. 10-2018-0021790 filed in the Korean Intellectual Property Office on Feb. 23, 2018, the entire content of which is incorporated herein by reference.

The present disclosure relates to an electrode structure including a graphene-graphitic carbon composite layer, a method for fabricating the same, and an electrochemical device including the same.

BACKGROUND ART

Since graphene, which has recently attracted attention, has not only very high electrical conductivity and flexibility, but also transparent properties, studies have been actively conducted to use the same as a flexible transparent electrode or as an electron transport material such as an electron transport layer in an electronic device.

For mass production of graphene-based films, it is necessary to consider standards such as synthesis temperature, synthesis speed, and whether large area synthesis of graphene is possible. In this regard, methods for synthesizing graphene include an exfoliation method of physically separating graphene from graphite (so called Scotch tape method), a direct growth method of directly growing graphene on a metal catalyst, and the like.

In order to pattern a carbon-based electrode including such a graphene-based material, a method of performing the patterning using DVD laser etching has been suggested. However, this method has problems in that it is difficult to apply to large-area patterning and requires a process of synthesizing, transferring and patterning a graphene-based material, resulting in an excessive increase in the process cost. In addition, a method of forming a carbon-based electrode using inkjet printing has also been suggested, but there still remain a problem in that the development of a suitable carbon precursor ink is required for fabrication of a carbon-based electrode including a graphene-based material, a problem in that the formation of a precise pattern is difficult due to the accumulation of impurities in the nozzle of an inkjet printer, and the like. That is, a conventional patterned carbon-based electrode has problems in that the synthesis of a graphene-based material is not smoothly achieved, the attachment of the graphene-based material is not easy, and the mass production of the graphene-based material is difficult.

PRIOR ART DOCUMENTS (Patent Document 1) Korean Patent Application Publication No. KR 10-2017-0142361 A

DISCLOSURE

Technical Problem

An object of the present disclosure is to provide a novel electrode structure having excellent adhesion between a graphene-graphitic carbon composite layer and a metal thin film, and a fabrication method capable of mass-producing the electrode structure by a simple process.

However, problems to be solved by the present disclosure are not limited to the above-mentioned problem, and other problems which are not mentioned will be clearly understood by those skilled in the art from the following description.

Technical Solution

One embodiment of the present disclosure provides an electrode structure including: a metal thin film; and a patterned graphene-graphitic carbon composite layer disposed on the metal thin film, wherein the patterned graphene-graphitic carbon composite layer includes a graphene layer and graphitic carbon nanoparticles.

Another embodiment of the present disclosure provides a method for fabricating the electrode structure, the method including steps of: forming a patterned printed layer on a metal thin film by laser printing using a laser printer toner containing carbon powder; and forming a patterned graphene-graphitic carbon composite layer on the metal thin film by annealing the metal thin film having the patterned printed layer formed thereon.

Still another embodiment of the present disclosure provides an electrochemical device including the electrode structure.

Advantageous Effects

The electrode structure according to one embodiment of the present disclosure has excellent adhesion between the metal thin film and the patterned graphene-graphitic carbon composite layer and excellent chemical stability, and is applicable as an electrode for an electrochemical device such as a supercapacitor or a lithium-ion battery without requiring a separate additional process.

The method for fabricating an electrode structure according to one embodiment of the present disclosure has an advantage in that the electrode structure may be mass-produced by a simple process. Specifically, the method for fabricating an electrode structure according to one embodiment of the present disclosure has an advantage in that the electrode structure may be mass-produced by a roll-to-roll continuous process using a commercial laser printer toner and a commercial laser printing method.

BEST MODE

Throughout the present specification, it is to be understood that when any part is referred to as "including" any component, it does not exclude other components, but may further include other components, unless otherwise specified.

In the present specification, "graphene layer" refers to a flake or sheet-like layer formed of graphene in which multiple carbon atoms are linked together by covalent bonding to form a polycyclic aromatic molecule. The carbon atoms linked together by covalent bonding form a 6-membered ring as a basic repeat unit, but the graphene layer may further contain a 5-membered ring and/or a 7-membered ring. The graphene layer may have various structures, and such structures may vary depending on the contents of the 5-membered ring and/or 7-membered ring that may be contained in the graphene. The graphene layer may be composed of a single layer, and may also be composed of a plurality of layers formed by stacking of the plurality of single layers. Generally, the side ends of the graphene may be saturated with hydrogen atoms.

Hereinafter, the present disclosure will be described in more detail.

One embodiment of the present disclosure provides an electrode structure including: a metal thin film; and a patterned graphene-graphitic carbon composite layer disposed on the metal thin film, wherein the patterned graphene-graphitic carbon composite layer includes a graphene layer and graphitic carbon nanoparticles.

Figure 1:
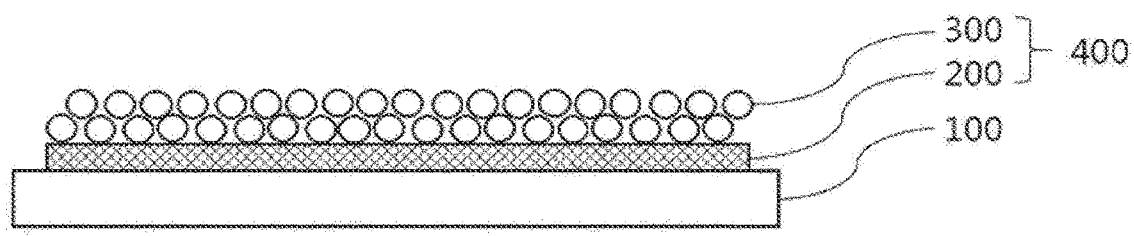
FIG. 1 schematically illustrates the cross-sectional structure of an electrode structure according to one embodiment of the present disclosure.

FIG. 1 schematically illustrates the cross-sectional structure of an electrode structure according to one embodiment of the present disclosure. Specifically, FIG. 1 illustrates the cross-sections of a metal thin film 100, a graphene layer 200 disposed on the metal thin film 100, and graphitic carbon nanoparticles 300 disposed on the graphene layer 200. In addition, referring to FIG. 1, the graphene layer 200 and the graphitic carbon nanoparticles 300 form a patterned graphene-graphitic carbon composite layer 400. FIG. 1 is intended to illustrate the cross-sectional structure of the electrode structure, and omits illustration of the pattern shape of the patterned graphene-graphitic carbon composite layer and the like.

Figure 2:
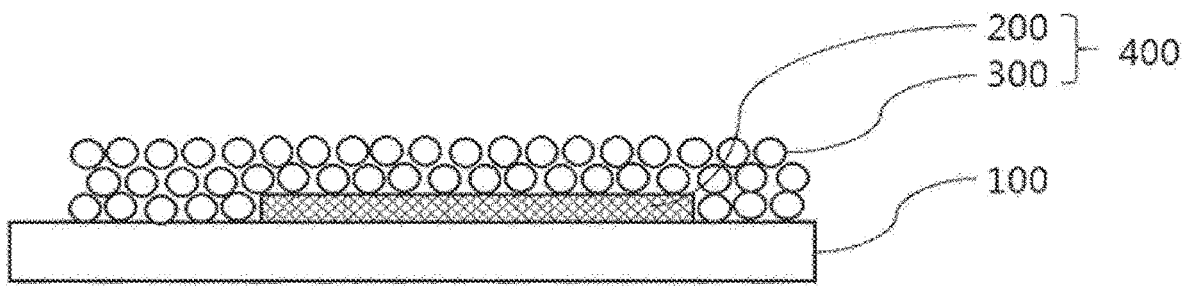
FIG. 2 schematically illustrates the cross-sectional structure of an electrode structure according to another embodiment of the present disclosure.

FIG. 2 schematically illustrates the cross-sectional structure of an electrode structure according to another embodiment of the present disclosure. Specifically, FIG. 2 illustrates the cross-sections of a metal thin film 100, a graphene layer 200 disposed on the metal thin film 100, and graphitic carbon nanoparticles 300 disposed on the metal thin film 100 on which the graphene layer 200 is not formed. In addition, referring to FIG. 2, the graphene layer 200 and the graphitic carbon nanoparticles 300 form a patterned graphene-graphitic carbon composite layer 400. FIG. 2 is intended to illustrate the cross-sectional structure of the electrode structure, and omits illustration of the pattern shape of the patterned graphene-graphitic carbon composite layer, two or more graphene layers spaced apart from each other and the like.

According to one embodiment of the present disclosure, the metal thin film may be a copper thin film or a nickel thin film. For example, the metal thin film may be a commercially available foil-type copper thin film or nickel thin film.

The metal thin film may function as a current collector in the electrode structure or as a support for the graphene-graphitic carbon composite layer.

According to one embodiment of the present disclosure, the patterned graphene-graphitic carbon composite layer may be provided as various electrode patterns on the metal thin film. For example, the patterned graphene-graphitic carbon composite layer may be provided on the metal thin film in the form of an electrode pattern in which comb-like patterns are interdigitated.

Figure 3:
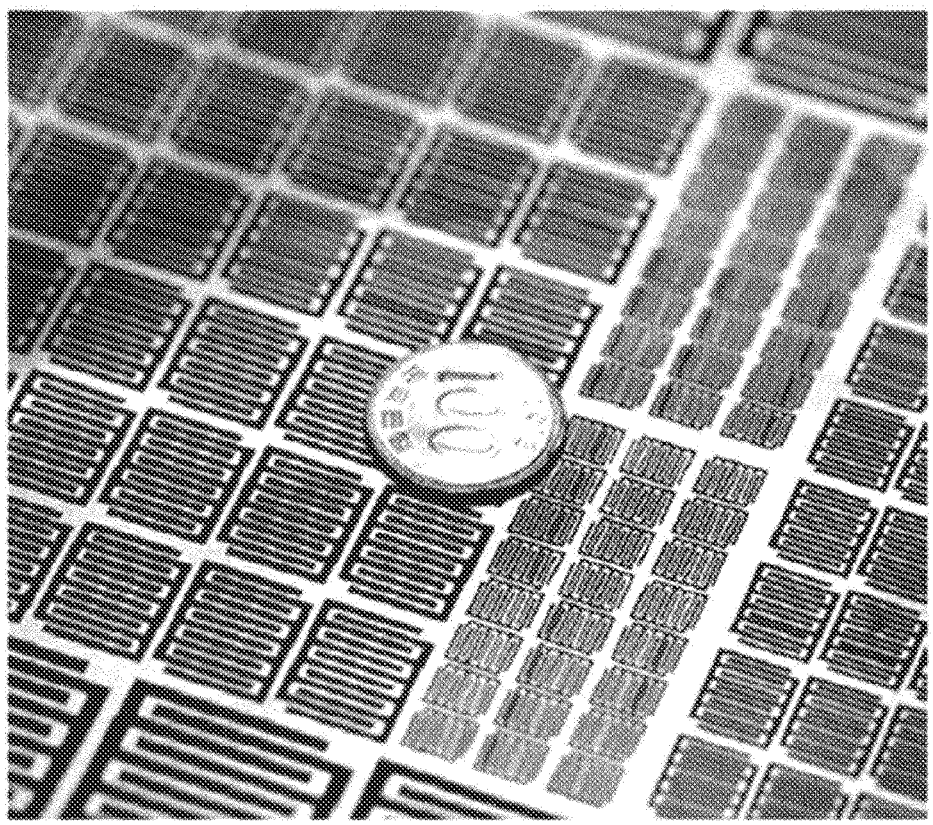
FIG. 3 illustrates the electrode pattern of the patterned graphene-graphitic carbon composite layer of an electrode structure according to one embodiment of the present disclosure.

FIG. 3 illustrates the electrode pattern of the patterned graphene-graphitic carbon composite layer of an electrode structure according to one embodiment of the present disclosure. Specifically, as illustrated in FIG. 3, the patterned graphene-graphitic carbon composite layer of the electrode structure according to one embodiment of the present disclosure may be provided as an electrode pattern in which comb-like patterns are interdigitated with various scales.

According to one embodiment of the present disclosure, the graphene layer may include a graphene sheet consisting of 1 to 10 layers.

The number of layers of the graphene sheet included in the graphene layer may vary depending on the metal material of the metal thin film. Specifically, when the metal thin film is a copper thin film, the graphene layer may include a graphene sheet consisting of 1 or 3 layers, and when the metal thin film is a nickel thin film, the graphene layer may include a graphene sheet consisting of 2 or more layers.

In addition, the graphene layer may include graphene having various shapes, such as graphene flakes, in addition to the graphene sheet.

According to one embodiment of the present disclosure, the graphene layer may be included in the patterned graphene-graphitic carbon composite layer while coming into direct contact with the metal thin film. Specifically, the graphene layer may be provided in direct contact with the metal thin film without a separate adhesive material interposed therebetween. The electrode structure may have very excellent adhesion between the metal thin film and the patterned graphene-graphitic carbon composite layer, and furthermore, may exhibit better electrical conductivity.

According to one embodiment of the present disclosure, the graphene layer may be provided in the entire area of the patterned graphene-graphitic carbon composite layer on the metal thin film. In this case, as shown in FIG. 1, the graphitic carbon nanoparticles 300 may be provided on the graphene layer 200.

In addition, according to one embodiment of the present disclosure, the graphene layer may be provided as two or more graphene layers spaced apart from each other in the patterned graphene-graphitic carbon composite layer region on the metal thin film. In this case, as shown in FIG. 2, the graphitic carbon nanoparticles 300 may be provided on the graphene layer 200 and the metal thin film 100 on which the graphene layer is not formed, to form a patterned graphene-graphitic carbon composite layer.

According to one embodiment of the present disclosure, the graphitic carbon nanoparticles may each have a diameter of nm to 500 nm. Specifically, the graphitic carbon nanoparticles may each have a diameter of 50 nm to 500 nm, or 100 nm to 500 nm. The diameter may mean the maximum diameter of the nanoparticle.

The graphene-graphitic carbon composite layer may realize a high surface area by the graphitic carbon nanoparticles, and thus exhibit excellent electrode performance when applied to an electrode for an electrochemical device.

According to one embodiment of the present disclosure, the graphitic carbon nanoparticles may each include at least one of graphite and highly oriented pyrolytic graphite (HOG).

The graphitic carbon nanoparticles may have various shapes such as a spherical shape, an elliptical shape or a rod-shape. Specifically, the graphitic carbon nanoparticles may each have a spherical shape.

According to one embodiment of the present disclosure, the thickness of the patterned graphene-graphitic carbon composite layer may be 1 nm to 50 μm. Specifically, the thickness of the patterned graphene-graphitic carbon composite layer may be 1 nm to 30 μm, 500 nm to 30 μm, or 1 μm to 10 μm.

Since the patterned graphene-graphitic carbon composite layer may be formed as a thin film, it is advantageously applied to a small-sized high-capacity electrochemical device such as a supercapacitor.

Another embodiment of the present disclosure provides a method for fabricating the electrode structure, the method including steps of: forming a patterned printed layer on a metal thin film by laser printing using a laser printer toner containing carbon powder; and forming a graphene-graphitic carbon composite layer on the metal thin film by annealing the metal thin film having the patterned printed layer formed thereon.

Figure 4:
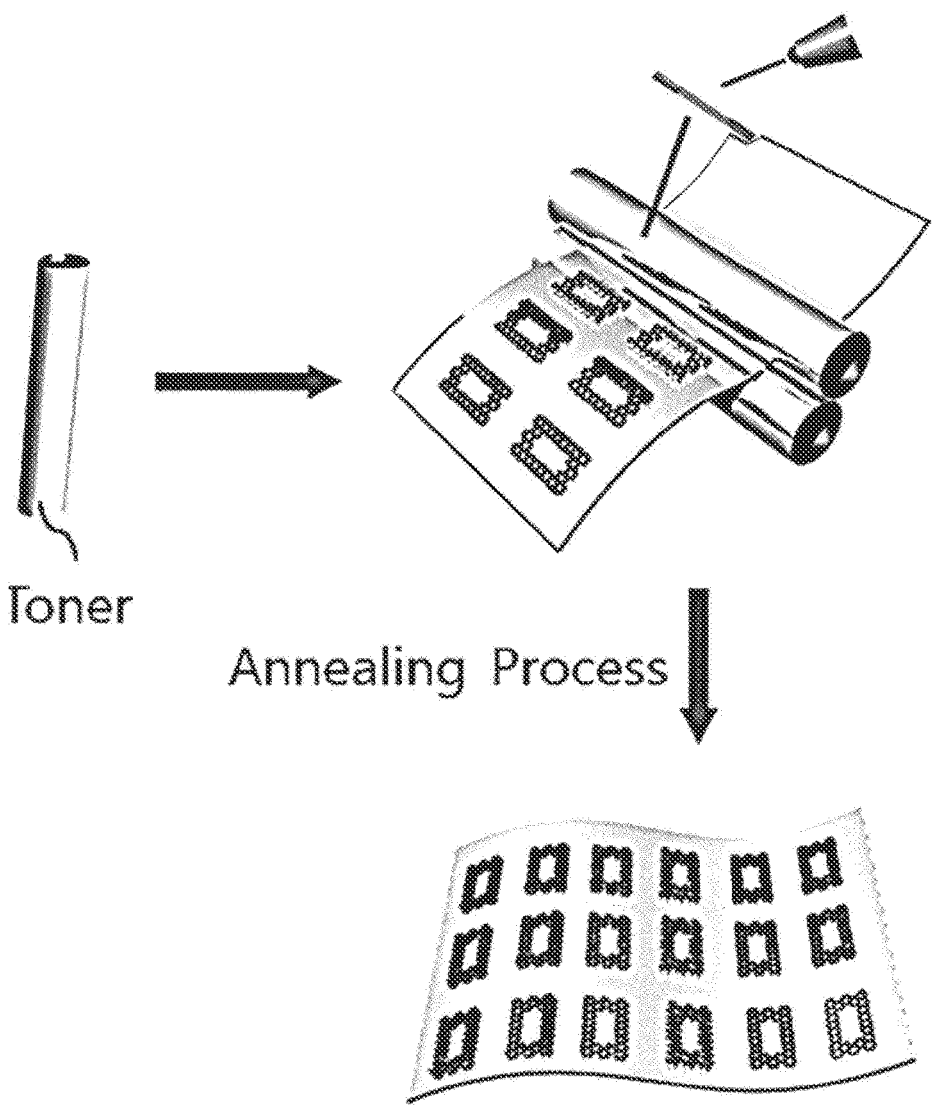
FIG. 4 illustrates a method for fabricating an electrode structure according to one embodiment of the present disclosure.

FIG. 4 illustrates a method for fabricating an electrode structure according to one embodiment of the present disclosure. Specifically, FIG. 4 schematically illustrates fabricating an electrode structure by forming a patterned printed layer on a metal thin film by laser printing using a commercial laser printer toner, followed by annealing.

As the laser printer toner, any toner for laser printing containing carbon powder may be used without limitation. Specifically, a commercial black laser toner may be used as the laser print toner. The method of fabricating the electrode structure has an advantage in that, since a commercial laser printer toner is used as a precursor for a carbon-based electrode and an electrode material is easily available, it is possible to easily solve problems such as carbon precursor ink development in a conventional method of fabricating a carbon-based electrode using inkjet printing.

In addition, according to one embodiment of the present disclosure, the laser printing may be performed using a general laser printing method. Specifically, the laser printing may be performed using a system to which a conventionally known laser printing technology is applied.

That is, in the step of forming the patterned printed layer, the printed layer may be formed using a printing system with a generally used laser and a commercial laser printer toner. In addition, the method of the present disclosure also has an advantage in that the metal thin film having the patterned printed layer formed thereon may be easily obtained by applying the metal thin film instead of paper to a commercial laser printer.

According to one embodiment of the present disclosure, the metal thin film in the step of forming the patterned printed layer may be a copper thin film or a nickel thin film. Specifically, the metal thin film in the step of forming the patterned printed layer may be the same as the metal thin film in the above-described electrode structure.

The thickness of the metal thin film may be appropriately selected according to the distance between rolls of the laser printing system and/or the intended use of the electrode structure.

In addition, the method for fabricating the electrode structure has an advantage in that, since the patterned printed layer may be easily formed by layer printing, the electrode pattern may be formed in a simple manner without the need to add a separate process such as laser scribing or lithography for patterning a conventional carbon-based electrode.

Figure 5:
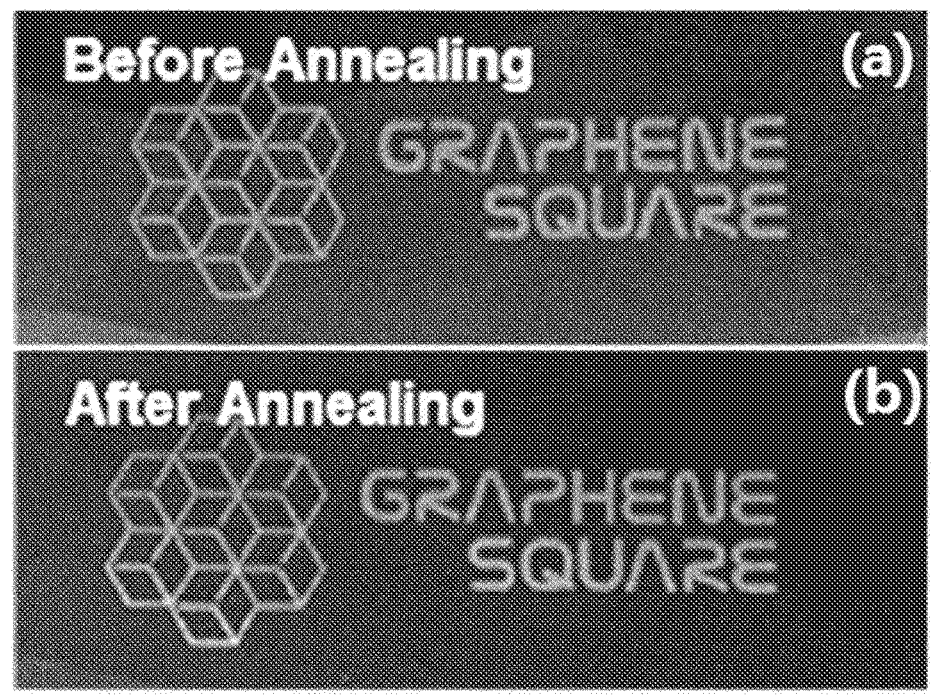
FIG. 5 illustrates a patterned printed layer and patterned graphene-graphitic carbon composite layer obtained by the method for fabricating an electrode structure according to one embodiment of the present disclosure.

FIG. 5 illustrates a patterned printed layer and patterned graphene-graphitic carbon composite layer obtained by the method for fabricating an electrode structure according to one embodiment of the present disclosure. Specifically, FIG. 5(a) illustrates a patterned printed layer (Before Annealing) formed by laser printing, and FIG. 5(b) illustrates a patterned graphene-graphitic carbon composite layer (After Annealing) formed by annealing the patterned printed layer. From FIG. 5, it can be seen that printed layers having various patterns may be formed by a simple method using laser printing.

According to one embodiment of the present disclosure, the patterned printed layer is formed into a patterned graphene-graphitic carbon composite layer by the annealing. That is, the pattern shape of the patterned printing layer may be the same as the pattern shape of the patterned graphene-graphitic carbon composite layer. However, since the thickness of the patterned printed layer is decreased due to removal of organic additives or the like other than carbon powder during the process in which the patterned printed layer is formed into the patterned graphene-graphitic carbon composite layer by the annealing process, the thickness of the patterned print layer may be larger than the thickness of the patterned graphene-graphitic carbon composite layer.

According to one embodiment of the present disclosure, the patterned printed layer may be formed to have a thickness of 1.5 nm to 75 μm. Specifically, the patterned printed layer may be formed to have a thickness of 1.5 nm to 45 μm, 750 nm to 45 μm, or 1.5 μm to 15 μm.

According to one embodiment of the present disclosure, the annealing may include steps of: heating the metal thin film at a temperature of 700° C. to 1,000° C.; and cooling the metal thin film to room temperature.

According to one embodiment of the present disclosure, the heating step may be performed at 700° C. to 900° C., specifically about 800° C.

According to one embodiment of the present disclosure, the heating step may be performed for 20 to 60 minutes. Specifically, the heating step may be performed for about 30 minutes. When the heating step is performed for the above-described time period, the removal of impurities from the patterned printed layer and the adsorption of carbon atoms onto the metal thin film may be sufficiently achieved.

Through the heating step, impurities such as organic additives other than carbon powder included in the patterned printed layer may be removed. Specifically, since the patterned printed layer may be formed by laser printing using a commercial laser printer toner, the patterned printed layer may contain various organic dyes and additives included in the laser printer toner. Such organic dyes and additives may be impurities of the graphene-graphitic carbon composite layer, but may be removed through the heating step.

In addition, through the heating step, the carbon powder of the printed layer may penetrate or be adsorbed into the metal lattice of the metal thin film in the form of carbon atoms. Furthermore, through the cooling step, carbon atoms that penetrated into the metal lattice of the metal thin film are diffused to the surface of the metal thin film, and the graphene layer may be formed. Thereby, the graphene layer may be formed in direct contact with the metal thin film.

The number of layers of the graphene sheet included in the graphene layer may be determined by the metal material of the metal thin film. That is, the number of layers of the graphene sheet may be determined according to the carbon solubility of the metal thin film at high temperature. For example, when the metal thin film is a copper thin film, a graphene sheet composed of 1 or 2 layers may be formed, and when the metal thin film is a nickel thin film, a graphene sheet composed of 2 or more layers may be formed.

According to one embodiment of the present disclosure, the room temperature in the cooling step may be 20° C. to 30° C., specifically 25° C.

Specifically, the cooling step may be performed by taking out the metal thin film having the patterned printed layer formed thereon from a furnace used for heating in the heating step and leaving the taken-out metal thin film at room temperature.

According to one embodiment of the present disclosure, the annealing may be performed under a hydrogen gas atmosphere. Specifically, the heating step and the cooling step may be performed under a hydrogen gas atmosphere. In addition, the annealing may be performed while supplying an inert gas together with the hydrogen gas so as to adjust the pressure of a reaction chamber.

According to one embodiment of the present disclosure, the annealing may be performed by heating and cooling while supplying hydrogen gas at a flow rate of 30 sccm to 100 sccm.

The hydrogen gas in the heating step may contribute to removing organic additives other than carbon powder included in the patterned printed layer. In addition, the hydrogen gas may prevent oxidation of the metal thin film, so that the patterned graphene-graphitic carbon composite layer may be formed directly on the metal thin film.

Furthermore, through the step of forming the patterned graphene-graphitic carbon composite layer, the carbon powder of the patterned printed layer may be formed into graphitic carbon nanoparticles. Specifically, carbon powder not absorbed into the metal thin film may be formed into graphitic carbon nanoparticles on the metal thin film.

Specifically, when the graphene layer is formed in the entire area of the graphene-graphitic carbon composite layer on the metal thin film, the graphitic carbon nanoparticles may be formed on the graphene layer. In addition, when the graphene layer is formed in a portion of the graphene-graphitic carbon composite layer on the metal thin film, the graphitic carbon nanoparticles may be formed on the graphene layer and the metal thin film on which the graphene layer is not formed.

According to one embodiment of the present disclosure, the patterned printed layer may be formed in plural on the metal thin film. Specifically, a plurality of patterned graphene-graphitic carbon composite layers may be formed by forming a plurality of patterned printed layers on the metal thin film using the laser printing.

According to one embodiment of the present disclosure, a plurality of electrode structures may be obtained by a simple method of forming a plurality of patterned graphene-graphitic carbon composite layers on the metal thin film, and then cutting the metal thin film into patterned graphene-graphitic carbon composite layer units.

According to one embodiment of the present disclosure, the steps in the method for fabricating the electrode structure may be sequentially repeated in a roll-to-roll continuous process. Specifically, since the laser printing is based on a roll-to-roll method, it may be easily applied to a roll-to-roll continuous process. Thereby, the method for fabricating the electrode structure has the advantage in that it is possible to easily mass-produce the electrode structure, and also has an advantage in that the method may be performed over a large area.

The electrode structure fabricated by the method for fabricating the electrode structure may be applied as an electrode for an electrochemical device without requiring a separate treatment process. Specifically, the electrode structure fabricated according to the method for fabricating the electrode structure has an advantage in that, since the patterned graphene-graphitic carbon composite layer is formed directly on the metal thin film functioning as a current collector, the electrode layer transfer and patterning processes in a conventional fabrication method do not need to be separately performed.

If necessary, after the metal thin film is removed from the electrode structure, fabricated by the above-described fabrication method, by using a metal etching method accompanied by a polymer support layer, only the graphene-graphitic carbon composite layer may be used as an electrode for an electrochemical device.

Still another embodiment of the present disclosure provides an electrochemical device including the electrode structure.

According to one embodiment of the present disclosure, the electrochemical device may be a supercapacitor, a lithium secondary battery, a fuel cell, or a gas generating device. The lithium secondary battery may be a lithium metal battery or a lithium ion battery. In addition, the gas generating device may be a hydrogen gas generating device, such as a water decomposition device, or a gas decomposition device such as a carbon dioxide reduction device.

The supercapacitor, the lithium secondary battery, the fuel cell and the gas generating device may be applied without limitation as long as they have a structure known in the art in addition to having the electrode structure as an electrode.

DESCRIPTION OF REFERENCE NUMERALS

100: Metal thin film
200: Graphene layer

300: Graphitic carbon nanoparticles
400: Patterned graphene-graphitic carbon composite layer

MODE FOR INVENTION

Hereinafter, the present disclosure will be described in detail with reference to examples. However, the examples according to the present disclosure may be modified into various different forms, and the scope of the present disclosure is not interpreted as being limited to the examples described below. The examples of the present specification are provided to more completely explain the present disclosure to those skilled in the art.

Example 1

A copper foil (Alfa Aesar, 99.999%) was prepared, and a printed layer having an electrode pattern was formed directly on the copper foil by laser printing using Fuji Xerox CP405d and a laser printer toner cartridge thereof.

The copper foil having the printed layer formed thereon was provided in a chamber into which a gas mixture of hydrogen gas with a flow rate of 50 sccm and argon gas with a flow rate of 500 sccm was injected. The copper foil was heated in a furnace at a temperature of about 800° C. in the chamber for about 30 minutes. Furthermore, the copper foil having the printed layer formed thereon was taken out of the furnace and cooled at room temperature (25° C.) to form an electrode structure.

A field emission scanning electron microscope (FE-SEM; AURIGA Carl Zeiss) was used to observe the surface structure of the electrode structure fabricated in Example 1, and a transmission electron microscope (TEM; JEOL JEM-2100) was used to observe the morphology of the electrode structure.

Figure 6:
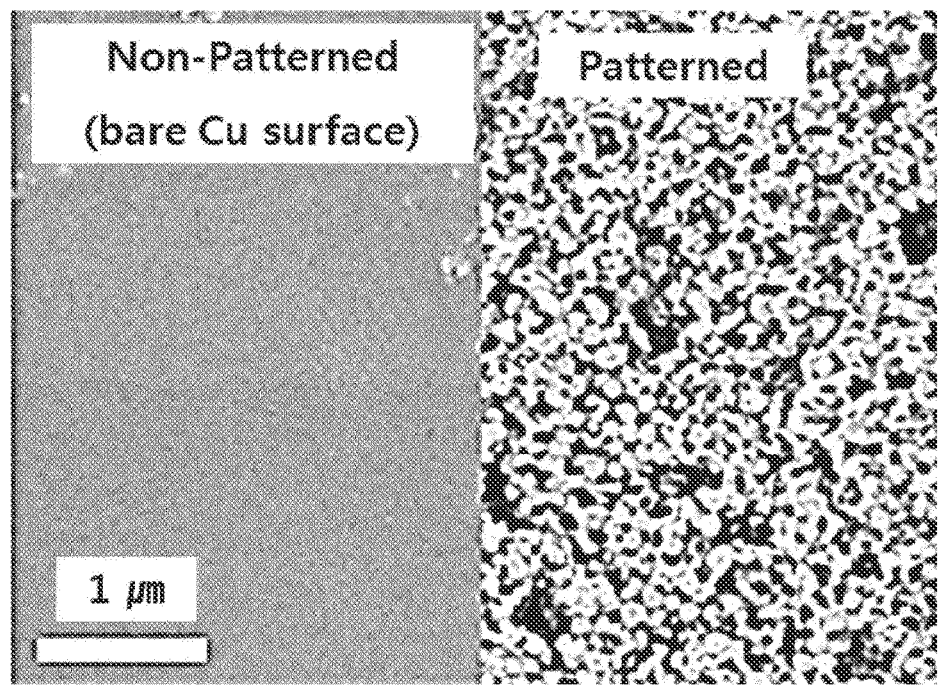
FIG. 6 shows an FE-SEM image of an electrode structure fabricated according to Example 1.

FIG. 6 shows an FE-SEM image of the electrode structure fabricated according to Example 1. Referring to FIG. 6, it can be seen that spherical graphitic carbon nanoparticles were formed on the surface of an electrode pattern in a region (Patterned) in which the electrode pattern was formed, unlike a region (Non-patterned) in which no electrode pattern was formed.

Figure 7:
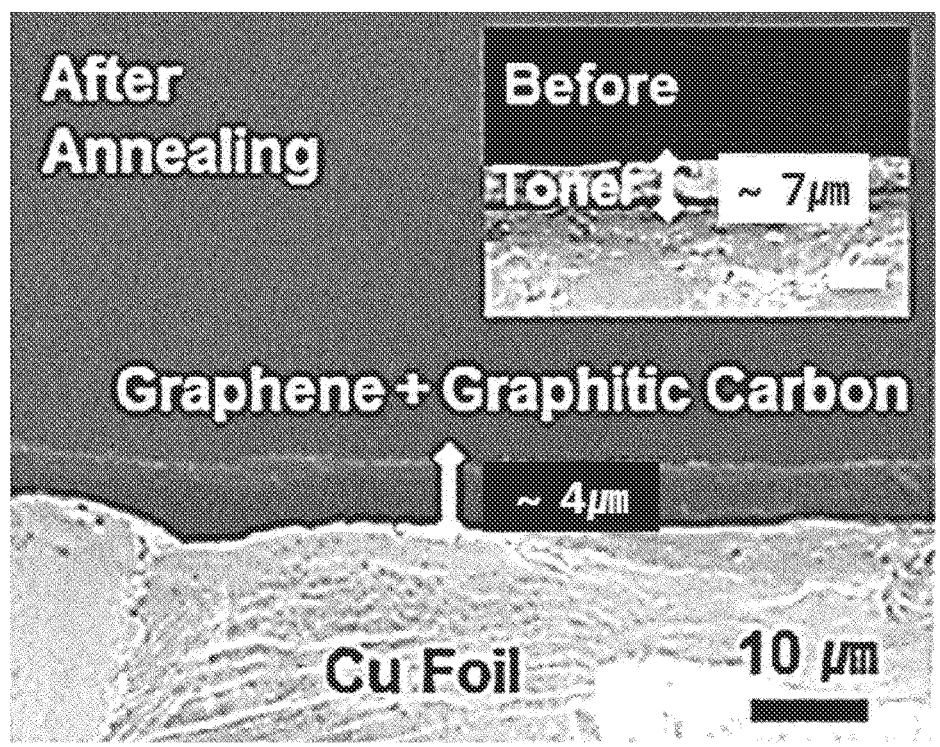
FIG. 7 shows a cross-sectional FE-SEM image of the electrode structure fabricated according to Example 1.

FIG. 7 shows a cross-sectional FE-SEM image of the electrode structure fabricated according to Example 1, and it can be seen that a graphene-graphitic carbon composite layer was formed on the copper foil to have a thickness of about 4 μm. The image at the upper right of FIG. 7 corresponds to a cross-sectional FE-SEM image of the printed layer region having the electrode pattern formed thereon before annealing, and the thickness of the region in which the electrode pattern is formed before annealing was about 7 μm. Therefore, it can be seen that non-carbon impurities (e.g., a binder, a pigment, etc.) contained in the toner before annealing were removed by heating in annealing, and thus the thickness of the graphene-graphitic carbon composite layer was decreased compared to the thickness of the printed layer.

Figure 8:
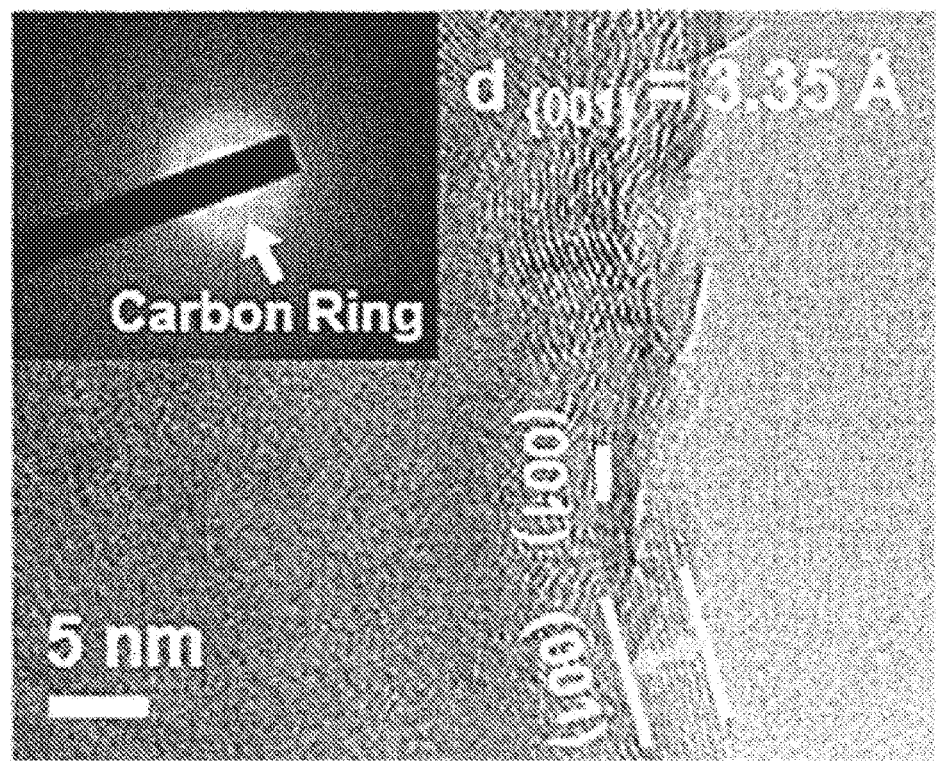
FIG. 8 shows a cross-sectional TEM image of the electrode structure fabricated according to Example 1.

FIG. 8 shows a cross-sectional TEM image of the electrode structure fabricated according to Example 1. The insert in the upper left of FIG. 8 shows a carbon ring diffraction pattern of the graphene-graphitic carbon composite layer of the electrode structure fabricated according to Example 1, and from the insert, it can be seen that the graphene-graphitic carbon composite layer was formed of carbon layers having a multilayer structure. Furthermore, referring to the TEM image of FIG. 8, it can be seen that carbon layers were formed in the entire area of the graphene-graphitic carbon composite layer. (001) in FIG. 8 means the thickness (interlayer spacing) of each carbon layer, and thereby it can be seen that the carbon layers were formed to have a multilayer structure.

Example 2

An electrode structure was fabricated in the same manner as in Example 1 above, except that a 99.9% pure nickel foil was used.

Figure 9:
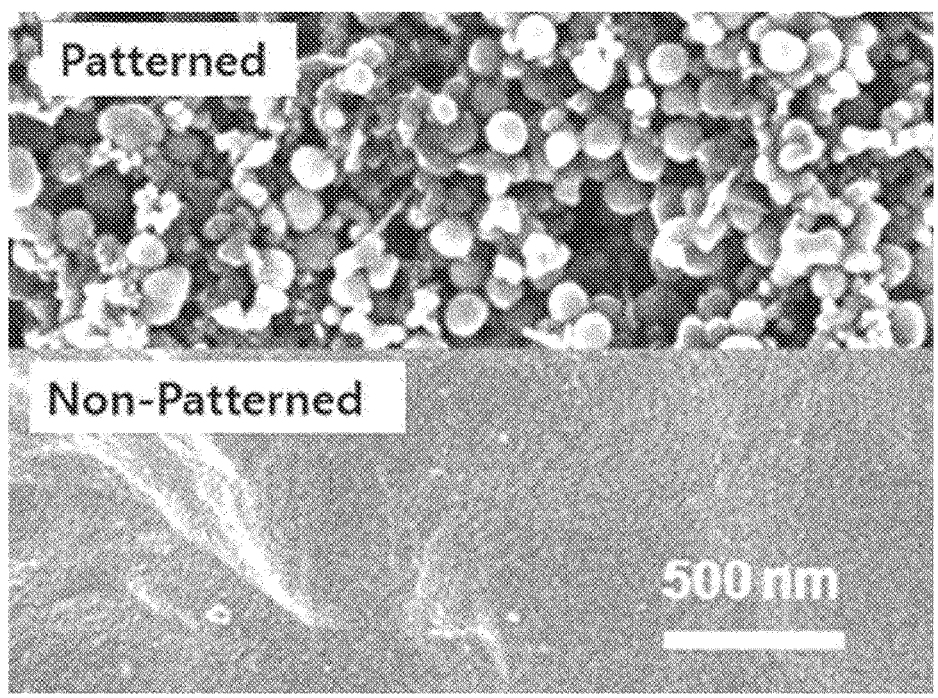
FIG. 9 shows an FE-SEM image of an electrode structure fabricated according to Example 2.

FIG. 9 shows an FE-SEM image of the electrode structure fabricated according to Example 2. Referring to FIG. 9, it can be confirmed that spherical graphitic carbon nanoparticles were formed on the surface of an electrode pattern in a region (Patterned) in which the electrode pattern was formed, unlike a region (Non-patterned) in which no electrode pattern was formed.

Figure 10:
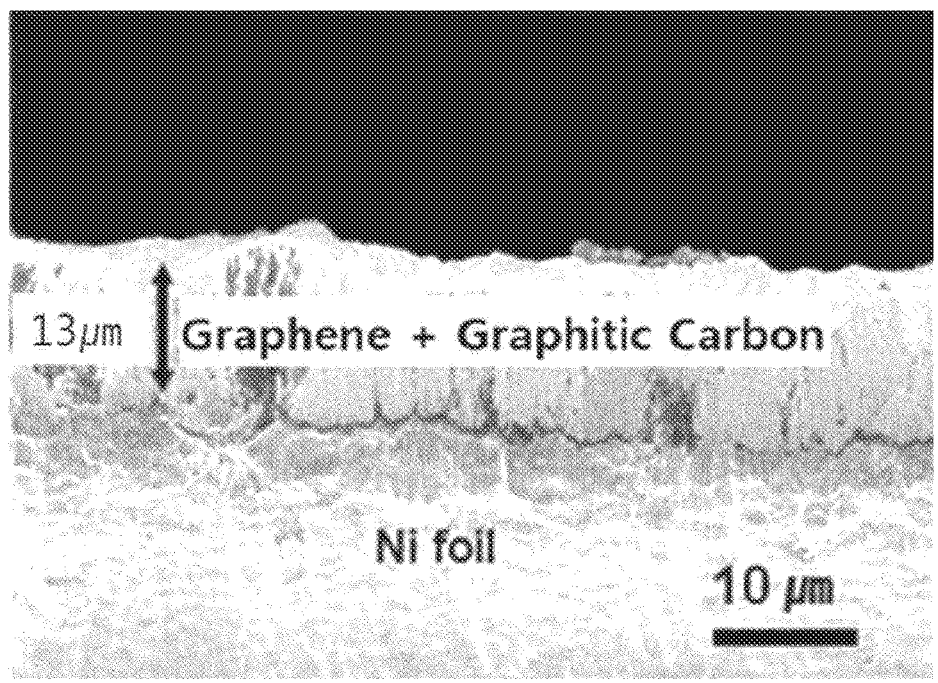
FIG. 10 shows a cross-sectional FE-SEM image of the electrode structure fabricated according to Example 2.

FIG. 10 shows a cross-sectional FE-SEM image of the electrode structure fabricated according to Example 2, and it can be seen that a graphene-graphitic carbon composite layer was formed on the nickel foil to have a thickness of about 13 μm. Since the carbon solubility of nickel at high temperature is higher than the carbon solubility of copper at high temperature, it can be seen that the thickness of the graphene-graphitic carbon composite layer formed on the nickel foil is larger than the thickness of that formed on the copper foil.

[Experimental Example 1]—Raman Spectroscopy and Fourier Transform-Infrared Spectroscopy (FT-IR) of Graphene-Graphitic Carbon Composite Layer In order to measure whether a pigment and organic binder contained in the laser printer toner remain in the electrode structure fabricated by the fabrication method of the present disclosure, the printed layer (before annealing) and the graphene-graphitic carbon composite layer (after annealing), which were each formed as an electrode pattern in Example 1, were analyzed using Raman spectroscopy and Fourier transform-infrared spectroscopy (FT-IR).

Raman spectroscopy was performed using a Raman spectrometer (RM 1000-Invia, Renishaw, 514 nm), and FT-IR spectroscopy was performed using an FT-IR spectrometer (Thermo Scientific Nicolet 6700 spectrometer).

Figure 11:
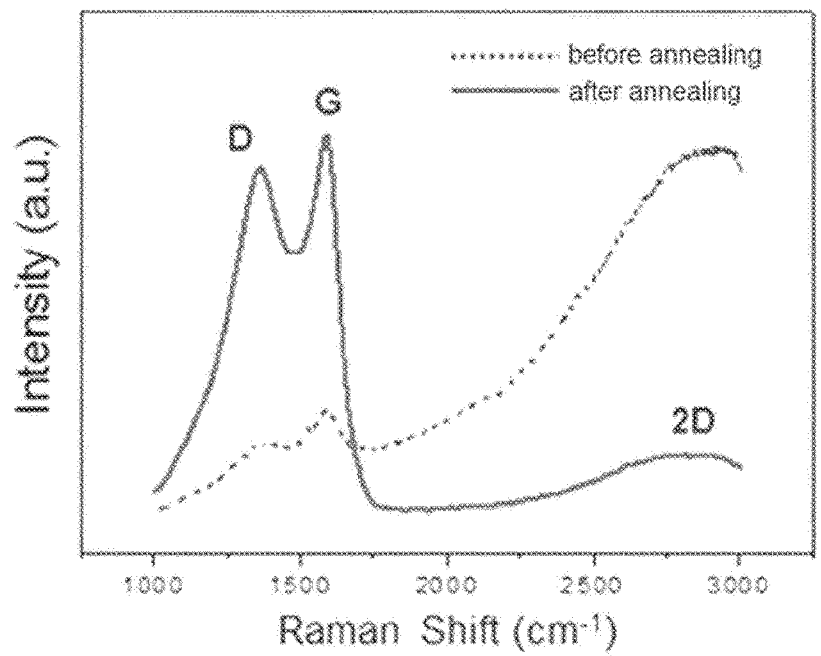
FIG. 11 is a graph showing the results of Raman spectroscopy performed according to Experimental Example 1.

FIG. 11 is a graph showing the results of Raman spectroscopy performed according to Experimental Example 1. Referring to FIG. 11, it can be confirmed that the F band and G band of the graphene-graphitic carbon composite layer formed after annealing in Example 1 significantly increased. This suggests that impurities such as a pigment included in the printed layer before annealing were removed and the graphene-graphitic carbon composite layer was formed.

Figure 12:
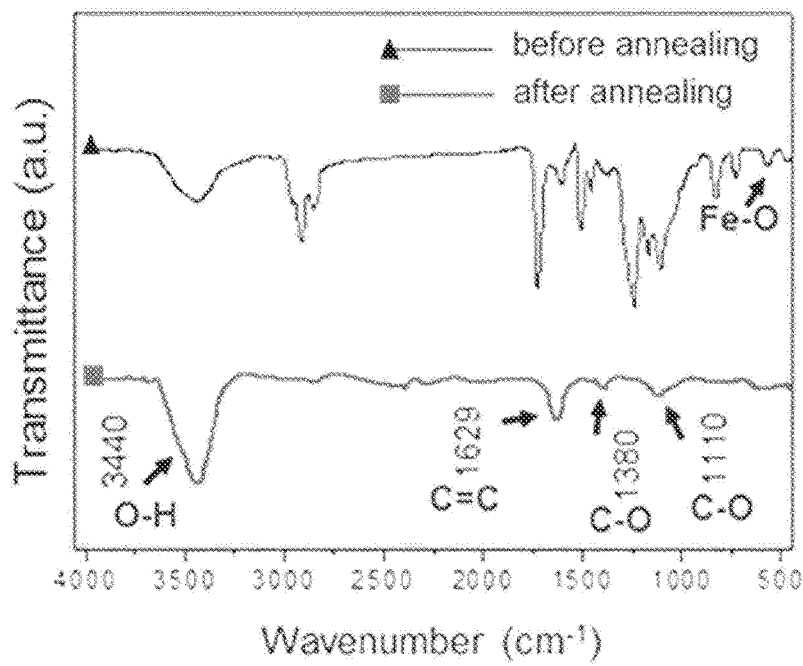
FIG. 12 is a graph showing the results of FT-IR spectroscopy performed according to Experimental Example 1.

FIG. 12 is a graph showing the results of FT-IR spectroscopy performed according to Experimental Example 1. Referring to the FT-IR spectroscopy results in FIG. 12, it can be confirmed that the various peaks of the pigment included in the printed layer before annealing in Example 1, except the C—O peak, disappeared by graphitization resulting from the annealing. This means that impurities such as a pigment, included in the printed layer before annealing, were removed through annealing and the graphene-graphitic carbon composite layer was formed.

[Experimental Example 2]—XPS Analysis of Graphene-Graphitic Carbon Composite Layer In order to confirm the carbon-carbon bond pattern of the graphene-graphitic carbon composite layer of the electrode structure fabricated by the fabrication method of the present disclosure, XPS (X-ray photoelectron spectroscopy) analysis was performed on the printed layer (before annealing) and the graphene-graphitic carbon composite layer (after annealing), which were each formed as an electrode pattern in Example 1. The XPS analysis was performed using the KRATOS AXIS-his model of Research Institute of Advanced Materials.

Figure 13:
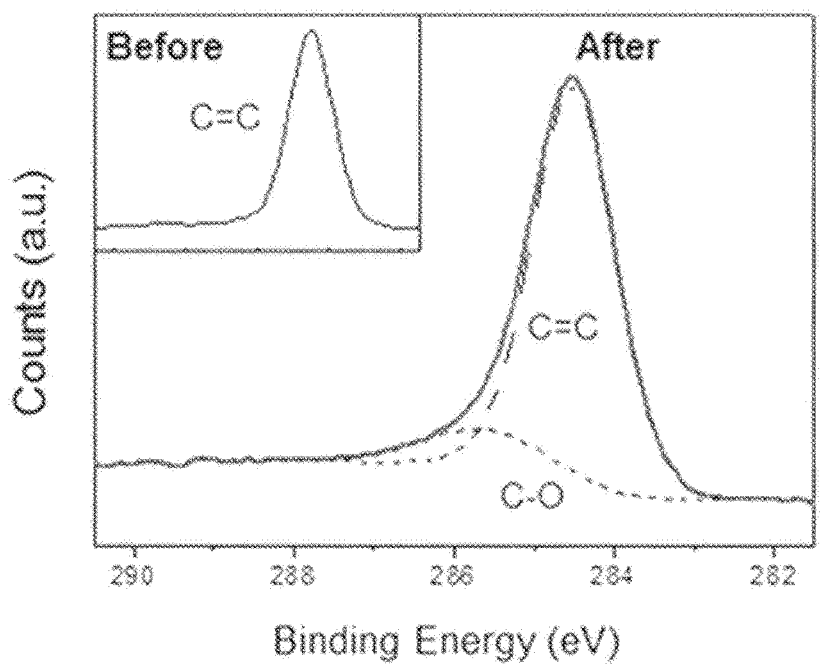
FIG. 13 shows the results of XPS analysis of the carbon (C) is peak, performed according to Experimental Example 2.

FIG. 13 shows the results of XPS analysis of the carbon (C) is peak, performed according to Experimental Example 2. Referring to FIG. 13, a carbon double bond (C=C) of carbon caused by an organic additive contained in the laser printer toner was observed in the printed layer before annealing. In addition, in the graphene-graphitic carbon composite layer after annealing (After), it was possible to merely confirm that the carbon-based material layer was formed, but it was not possible to clearly confirm due to a strong carbon peak whether an organic additive was removed. For reference, the dotted lines in the XPS analysis result for the carbon (C) is peak after annealing in FIG. 13 are the reference peaks of C=C and C—O.

Accordingly, in order to examine whether the organic additive was removed by annealing, XPS analysis of the oxygen (O) is peak was additionally performed as follows.

Figure 14:
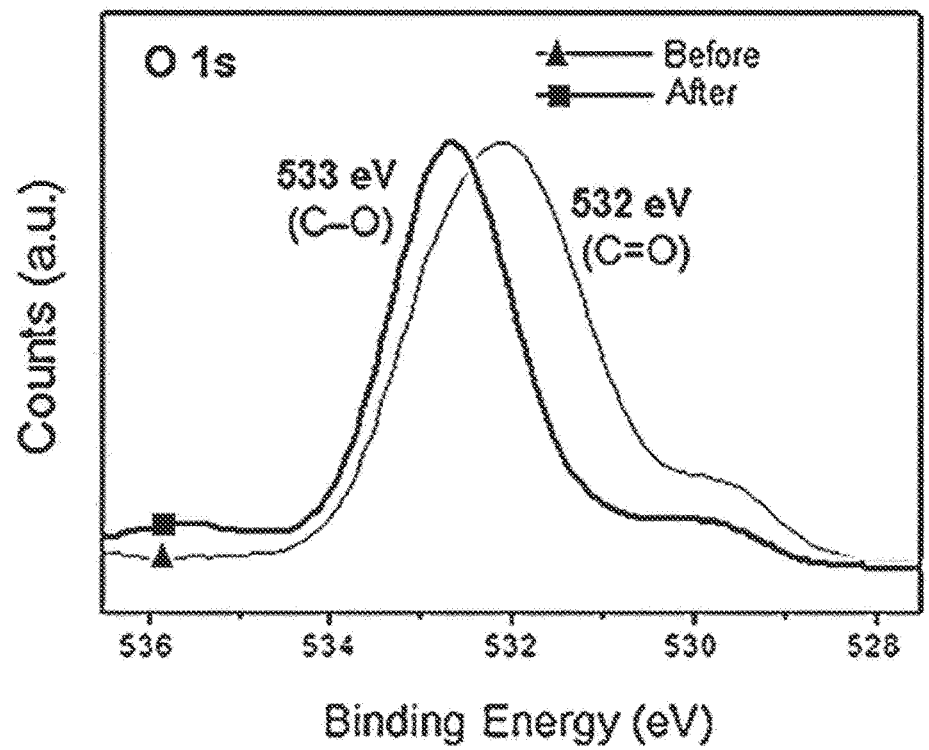
FIG. 14 shows the results of XPS analysis of the oxygen (O) is peak, performed according to Experimental Example 2.

FIG. 14 shows the results of XPS analysis of the oxygen (O) is peak, performed according to Experimental Example 2. Referring to FIG. 14, it can be seen that the O is peak that represents a C=O bond (about 532.0 eV) caused by annealing was shifted to the peak that represents a C—O bond (about 533.0 eV). Thereby, it can be seen that sp2 carbon occupying the most part before annealing was converted into a stable C—O bond, and oxygen was adsorbed onto the surface of the graphene-graphitic carbon composite layer after annealing. Thereby, it can be seen that the electrode structure according to Example 1 can withstand a severe electrochemical reaction such as that occurring in a supercapacitor.

[Experimental Example 3]—Measurement of Electrical Conductivity of Graphene-Graphitic Carton Composite Layer Depending on Applied Voltage In order to measure the electrical properties of the graphene-graphitic carbon composite layer of the electrode structure fabricated in Example 1, a polymer support layer was coated on the electrode structure fabricated in Example 1, and the copper foil was removed using an etching solution. Furthermore, the graphene-graphitic carbon composite layer attached onto the polymer support layer was transferred onto a SiO$_2$/Si wafer, and then the polymer support layer was removed using acetone. Furthermore, an FET (field effect transistor) device was fabricated by providing a metal electrode on the graphene-graphitic carbon composite layer, and then the electrical conductivity thereof was measured while the voltage was adjusted.

Figure 15:
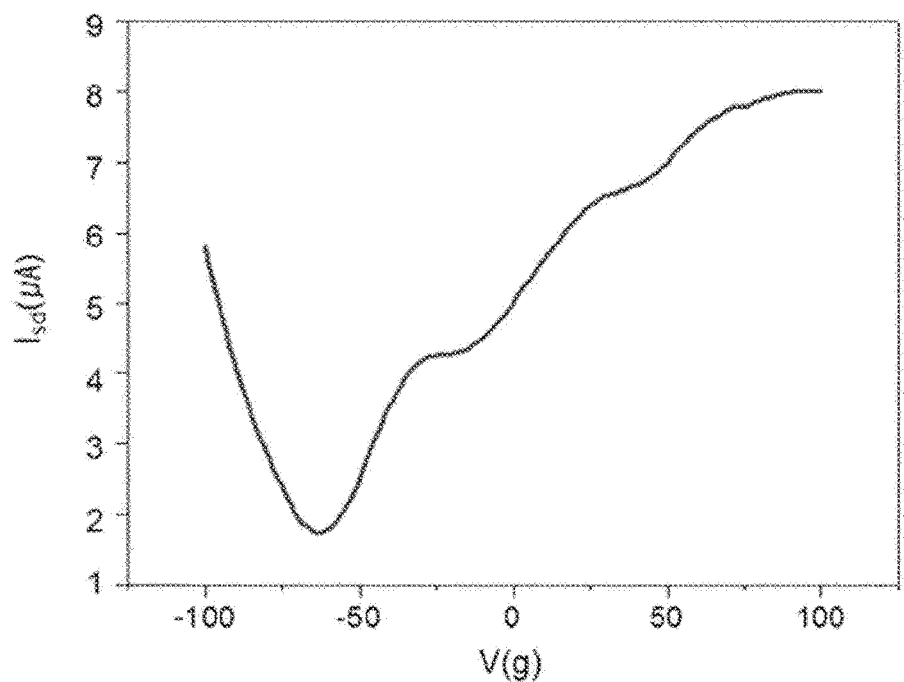
FIG. 15 is a graph showing voltage-dependent current changes measured according to Experimental Example 3.

FIG. 15 is a graph showing voltage-dependent current changes measured according to Experimental Example 3. Specifically, referring to the results in FIG. 15, it can be seen that the graphene-graphitic carbon composite layer fabricated in Example 1 shows a clear change in current value in the form of a Dirac cone around −50 V.

The electrons of graphene have a special energy band called Dirac Cone, and are characterized by having a Dirac Point where a valence band and a conduction band meet. Typical carbon materials do not exhibit such electrical characteristics. That is, since the electrical characteristics in the form of a Dirac cone as shown in FIG. 15 appear in a typical graphene layer, it can be seen that the graphene-graphitic carbon composite layer of Example 1 includes a graphene layer.

[Experimental Example 4]—Adhesion Test

For an adhesion test for an electrode structure sample prepared in the same manner as in Example 1, a peel-off test was performed using a method of attaching a commercial tape (3M company) to the surface of the sample by pressing with hand, and then peeling-off the tape with hand.

Figure 16:
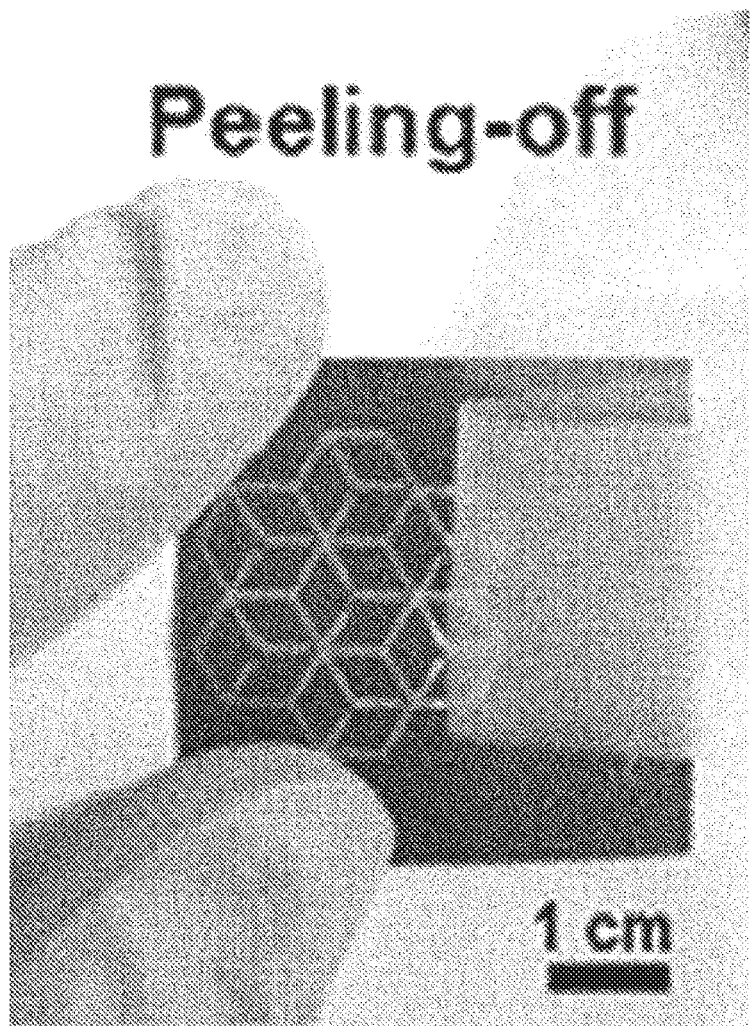
FIG. 16 shows a peel-off test image according to Experimental Example 4.

FIG. 16 shows a peel-off test image according to Experimental Example 4. Referring to FIG. 16, as a result of performing the peel-off test, it can be confirmed that the graphene-graphitic carbon composite layer of the electrode structure did not leave a stain on the tape.

In addition, for the adhesion test, a rubbing test was performed using a method of rubbing the surface of the electrode structure sample, prepared in the same manner as in Example 1, with a rubber-gloved-hand.

Figure 17:
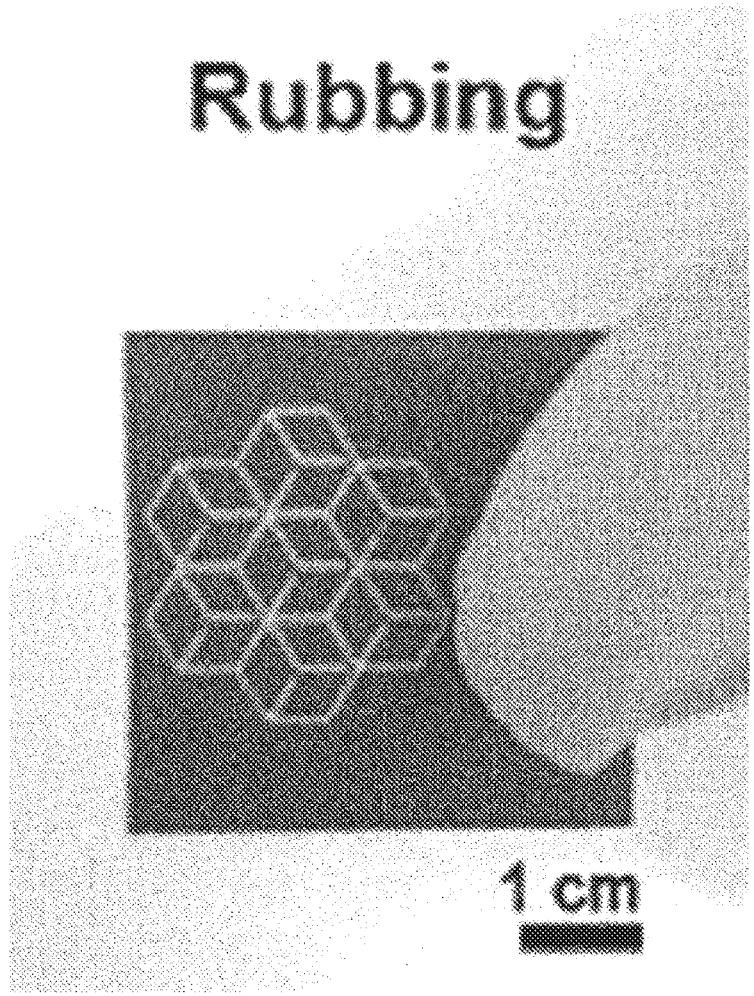
FIG. 17 shows a rubbing test image according to Experimental Example 4.

FIG. 17 shows a rubbing test image according to Experimental Example 4. Referring to FIG. 17, as a result of performing the rubbing test, it can be confirmed that the graphene-graphitic carbon composite layer of the electrode structure did not leave a stain on the glove.

From the results of the adhesion test according to Experimental Example 4, it can be confirmed that the electrode structure according to the present disclosure exhibits excellent adhesion between the graphene-graphitic carbon composite layer and the metal thin film, even though the graphene-graphitic carbon composite layer and the metal thin film are attached to each other without using a separate adhesive material.

[Experimental Example 5]—Chemical Resistance Test

For a chemical resistance test, the electrode structure sample prepared in the same manner as in Example 1 was immersed in various solutions (immersion solutions), and then the mass loss of the sample was measured.

Specifically, in each of a 1M organic solution containing LiPF$_6$ dissolved in ethylene carbonate/dimethyl carbonate (EC/DMC; 1:1 vol %), a 1M organic solution containing lithium bis(trifluoromethanesulfonyl)imide dissolved in tetraethylene glycol dimethyl ether (TEGDME), water, ethanol (EtOH), isopropanol (IPA), and acetone, the prepared electrode structure sample was immersed for 30 minutes, and then an immersion time-dependent change in the mass of the sample was measured. The results of the measurement are shown in Table 1 below.

TABLE 1

| Kind of immersion solution | Weight loss rate (%) |
| --- | --- |
| 1M LiPF$_6$ in EC/DMC | 99.49827 (±0.84113) |
| 1M LiTFSI in TEGDME | 99.01392 (±1.63166) |
| Water | 99.61559 (±0.16347) |
| Ethanol | 98.86182 (±1.22946) |
| Isopropanol | 98.72705 (±1.03887) |
| Acetone | 98.20168 (±1.01741) |

Referring to the results in Table 1, it can be seen that a maximum mass loss of about 3% occurred, which was a substantially negligible level. That is, it can be seen that the electrode structure according to the present disclosure, specifically, the graphene-graphitic carbon composite layer, exhibits excellent chemical resistance. Thereby, it can be seen that, when the electrode structure of the present disclosure is applied to an electrochemical device, it may improve the durability of the electrochemical device because of having excellent chemical resistance to various electrolytes.

[Experimental Example 6] Electrical Properties of Electrode Structure

In order to evaluate the electrical properties of the electrode structure fabricated according to Example 1, lithium metal as a counter electrode and the electrode structure as a working electrode were placed in a glove box, and an electrolyte containing 1M $LiPF_6$ dissolved in ethylene carbonate/dimethyl carbonate (EC/DMC; 1:1 vol %) was provided in the glove box, thereby preparing an experimental lithium-ion battery. Furthermore, a GF/F grade separator (Whatman, U.S.A.) was subjected to ultrasonic treatment in acetone and then dried at 180° C. before use.

The experimental lithium-ion battery can confirm that the electrode structure is applicable to a lithium-ion battery or a supercapacitor. That is, the performance of a lithium-ion battery or supercapacitor to which the electrode structure is applied may be predicted through the characteristics of the experimental lithium-ion battery.

Figure 18:
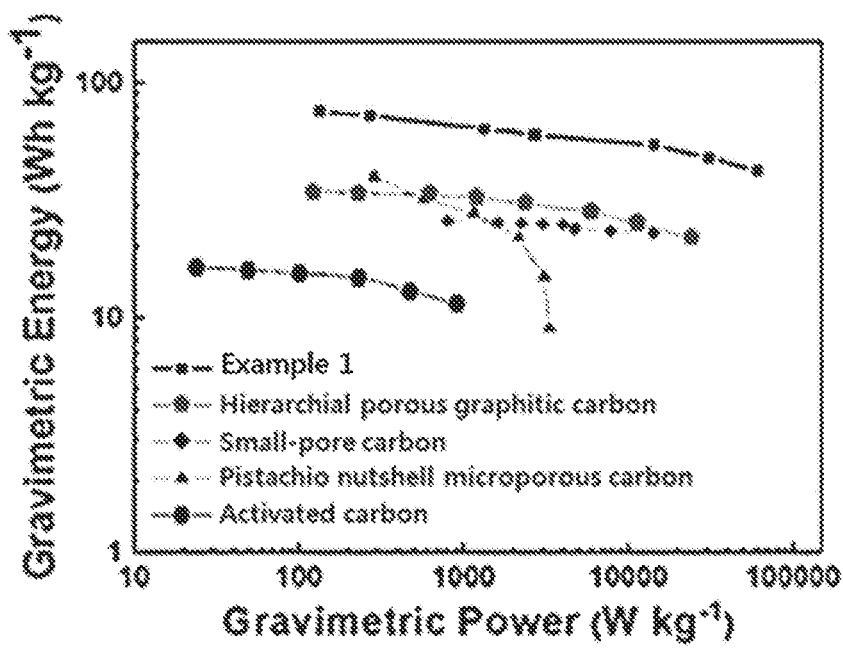
FIG. 18 shows a Ragone plot at particular current density for lithium-ion batteries in which each of the electrode structure fabricated according to Example 1 and other carbon-based electrodes is used as a working electrode.

FIG. 18 shows a Ragone plot at particular current density for lithium-ion batteries in which each of the electrode structure fabricated according to Example 1 and other carbon-based electrodes is used as a working electrode. Specifically, hierarchial porous graphitic carbon (HPLC) in FIG. 18 was prepared as described in "Wang, D. W.; Li, F.; Liu, M.; Lu, G. Q.; Cheng, H. M., 3D Aperiodic Hierarchical Porous Graphitic Carbon Material for High-Rate Electrochemical Capacitive Energy Storage, Angew. Chem., Int. Ed. 2008, 47, 373376"; small-pore carbon in FIG. 18 was prepared as described in "Chmiola, J.; Yushin, G.; Gogotsi, Y.; Portet, C.; Simon, P.; Taberna, P. L., Anomalous Increase in Carbon Capacitance at Pore Sizes Less than 1 Nanometer, Science 2006, 313, 17601763"; pistachio nutshell microporous carbon in FIG. 18 was prepared as described in "Xu, J. D.; Gao, Q. M.; Zhang, Y. L.; Tan, Y. L.; Tian, W. Q.; Zhu, L. H.; Jiang, L., Preparing Two-Dimensional Microporous Carbon from Pistachio Nutshell with High Areal Capacitance as Super-capacitor Materials, Sci. Rep. 2015, 4, 5545"; and activated carbon in FIG. 18 was prepared as described in "Frackowiak, E.; Lota, G.; Pernak, J, Room-Temperature Phosphonium Ionic Liquids for Supercapacitor Application, Appl. Phys. Lett. 2005, 86, 164104".

Referring to FIG. 18, it can be confirmed that the lithium-ion battery including the electrode structure according to Example 1 exhibits considerably better gravimetric energy than the conventionally known carbon-based materials. It appears that these results are because the graphene-graphitic carbon composite layer of the electrode structure fabricated according to Example 1 has a graphene layer composed of crystalline carbon together with graphitic carbon nanoparticles composed of amorphous carbon.

Furthermore, the storage performance of the lithium-ion battery according to Experimental Example 6 was evaluated using cyclic voltammetry (CV) at a scan rate of 0.1 mV/s to 10 mV/s.

Figure 19:
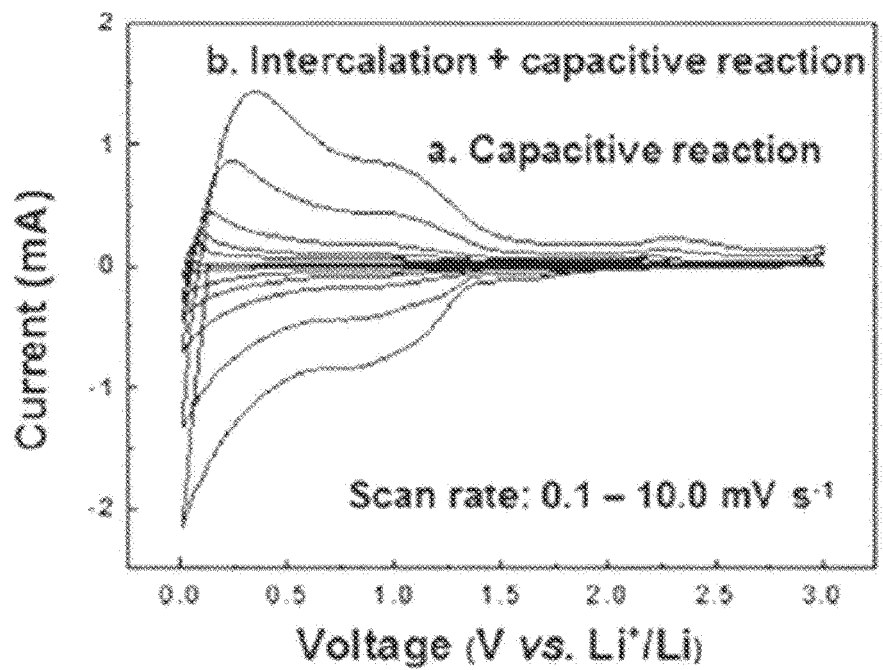
FIG. 19 shows the results of cyclic voltammetry (CV) of a lithium-ion battery according to Experimental Example 6.

FIG. 19 shows the results of cyclic voltammetry (CV) of the lithium-ion battery according to Experimental Example 6. Referring to FIG. 19, the lithium-ion battery including the electrode structure fabricated according to Example 1 characteristically shows a current peak (a) at about 1.1 V (vs. $Li^+/Li$) and a current peak (b) at about 0.1 V (vs. $Li^+/Li$).

Figure 20:
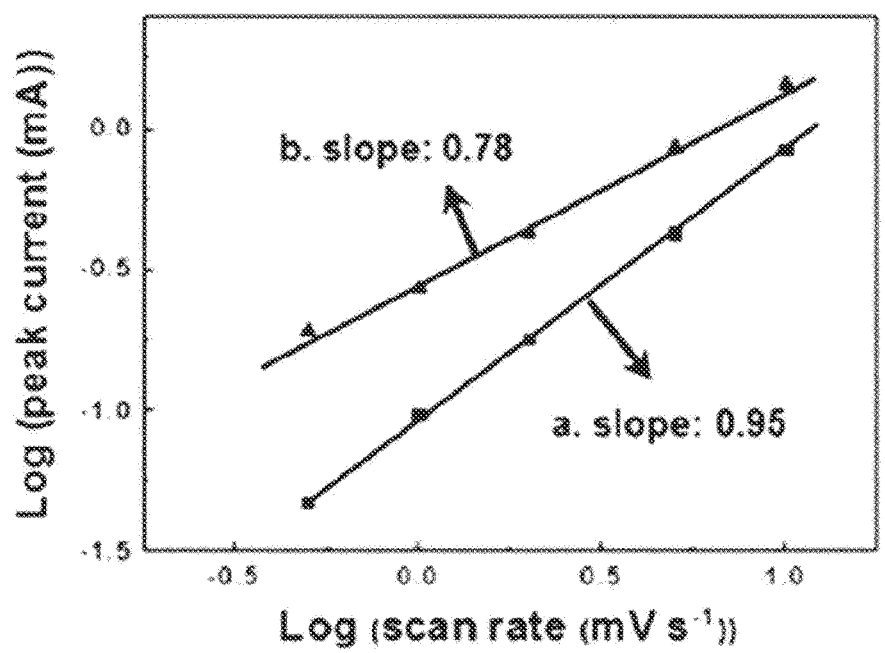
FIG. 20 is a graph showing the results of transforming the results of cyclic voltammetry shown in FIG. 19 into a log-log plot.

FIG. 20 is a graph showing the results of transforming the results of cyclic voltammetry shown in FIG. 19 into a log-log plot. That is, FIG. 20 shows the results of transforming the current peak (a) at about 1.1 V (vs. $Li^+/Li$) and the current peak (b) at about 0.1 V (vs. $Li^+/Li$) in FIG. 19 into log (scan rate) and log (current peak), respectively. In the log-log plot results shown in FIG. 19, the slope of the current peak (a) at about 1.1 V (vs. $Li^+/Li$) was 0.95, and the slope of the current peak (b) at about 0.1 V (vs. $Li^+/Li$) was 0.78. The results show that capacitive contribution occurs predominantly at the current peak (a) at about 1.1 V (vs. $Li^+/Li$), and a capacitive reaction and diffusion-controlled intercalation occur at the following current peak (b) at about 0.1 V (vs. $Li^+/Li$). That is, from the fact that this intercalation reaction occurs, it can be seen that the graphene-graphitic carbon composite layer of the electrode structure fabricated according to Example 1 was formed to have a layered structure.

Figure 21:
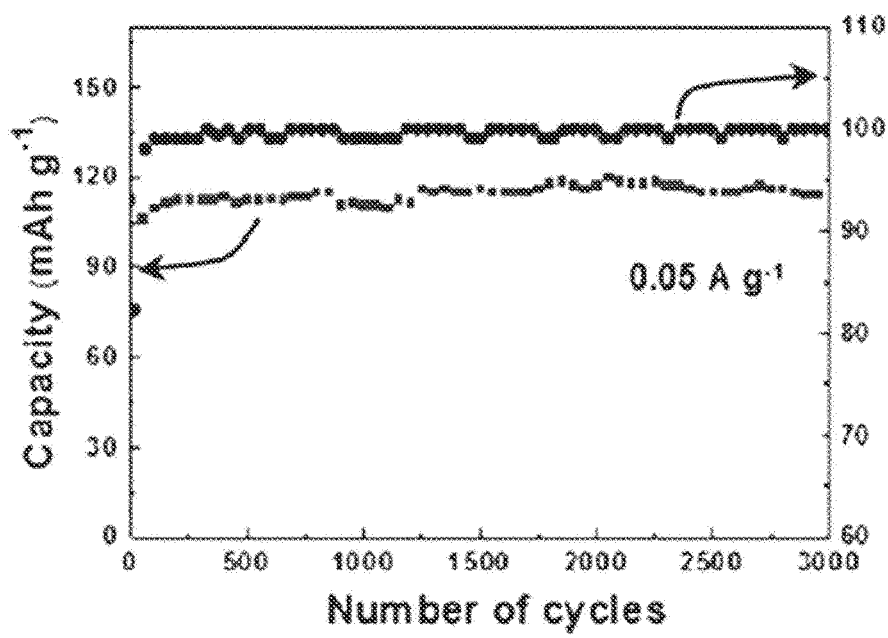
FIG. 21 is a graph showing the charge/discharge characteristics of a lithium-ion battery according to Experimental Example 6.

FIG. 21 is a graph showing the charge/discharge characteristics of the lithium-ion battery according to Experimental Example 6. Specifically, FIG. 21 shows the results of measuring stability during the charge/discharge process at 0.05 A/g in order to confirm the charge/discharge characteristics of the lithium-ion battery fabricated according to Experimental Example 6. Referring to FIG. 21, it can be seen that the lithium-ion battery to which the electrode structure according to Example 1 was applied exhibited stable capacitance during 3,000 charge/discharge cycles, and exhibited a capacity retention of about 100% even after 3,000 charge/discharge cycles.

The invention claimed is:

1. An electrode structure comprising:
   a metal thin film; and
   a patterned graphene-graphitic carbon composite layer disposed on the metal thin film,
   wherein the patterned graphene-graphitic carbon composite layer comprises a graphene layer and graphitic carbon nanoparticles.

2. The electrode structure of claim 1, wherein the graphene layer comprises a graphene sheet composed of 1 to 10 layers.

3. The electrode structure of claim 1, wherein the graphene layer is included in the patterned graphene-graphitic carbon composite layer while coming into direct contact with the metal thin film.

4. The electrode structure of claim 1, wherein the graphitic carbon nanoparticles each have a diameter of 1 nm to 500 nm.

5. The electrode structure of claim 1, wherein the metal thin film is a copper thin film or a nickel thin film.

6. The electrode structure of claim 1, wherein the patterned graphene-graphitic carbon composite layer has a thickness of 1 nm to 50 μm.

7. The electrode structure of claim 1, wherein the graphitic carbon nanoparticles comprise at least one of graphite and highly oriented pyrolytic graphite (HOPG).

8. A method for fabricating the electrode structure according to claim 1, the method comprising steps of:
   forming a patterned printed layer on a metal thin film by laser printing using a laser printer toner containing carbon powder; and
   forming a patterned graphene-graphitic carbon composite layer on the metal thin film by annealing the metal thin film having the patterned printed layer formed thereon.

9. The method of claim 8, wherein the steps are sequentially repeated in a roll-to-roll continuous process.

10. The method of claim 8, wherein the annealing comprises steps of:

heating the metal thin film at a temperature of 700° C. to 1,000° C.; and cooling the metal thin film to room temperature.

11. The method of claim 10, wherein the annealing is performed under a hydrogen gas atmosphere.

12. The method of claim 8, wherein the metal thin film is a copper thin film or a nickel thin film.

13. The method of claim 8, wherein the patterned printed layer is formed to have a thickness of 1.5 nm to 75 μm.

14. The method of claim 8, wherein the patterned printed layer is formed in plural on the metal thin film.

15. An electrochemical device comprising the electrode structure according to claim 1.

16. The electrochemical device of claim 15, wherein the electrochemical device is a supercapacitor, a lithium-ion battery, a fuel cell, or a gas generating device.

* * * * *